United States Patent
Angell et al.

(10) Patent No.: US 7,908,233 B2
(45) Date of Patent: Mar. 15, 2011

(54) METHOD AND APPARATUS FOR IMPLEMENTING DIGITAL VIDEO MODELING TO GENERATE AN EXPECTED BEHAVIOR MODEL

(75) Inventors: Robert Lee Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/771,887

(22) Filed: Jun. 29, 2007

(65) Prior Publication Data

US 2009/0006295 A1  Jan. 1, 2009

(51) Int. Cl.
*G06N 5/00* (2006.01)

(52) U.S. Cl. .......................... 706/21; 706/45
(58) Field of Classification Search .................. 706/21, 706/45
See application file for complete search history.

(56) References Cited

U.S. PATENT DOCUMENTS

| | | | |
|---|---|---|---|
| 5,091,780 A | 2/1992 | Pomerleau |
| 5,729,697 A | 3/1998 | Schkolnick et al. |
| 5,898,475 A | 4/1999 | Martin |
| 6,028,626 A | 2/2000 | Aviv |
| 6,101,486 A | 8/2000 | Roberts et al. |
| 6,191,692 B1 | 2/2001 | Stoltz et al. |
| 6,266,649 B1 | 7/2001 | Linden et al. |
| 6,400,276 B1 | 6/2002 | Clark |
| 6,976,000 B1 | 12/2005 | Manganaris et al. |
| 7,270,004 B2 | 5/2008 | Patel et al. |
| 7,630,986 B1 | 12/2009 | Herz et al. |
| 2002/0111852 A1 | 8/2002 | Levine |
| 2002/0143613 A1 | 10/2002 | Hong et al. |
| 2002/0161651 A1 | 10/2002 | Godsey et al. |
| 2002/0171736 A1 | 11/2002 | Gutta et al. |
| 2002/0178013 A1 | 11/2002 | Hoffman et al. |
| 2003/0217024 A1 | 11/2003 | Kocher |
| 2004/0111454 A1 | 6/2004 | Sorensen |
| 2004/0125125 A1 | 7/2004 | Levy |
| 2004/0143505 A1 | 7/2004 | Kovach |
| 2004/0225627 A1 | 11/2004 | Botros et al. |
| 2005/0002561 A1 | 1/2005 | Monachino et al. |
| 2005/0187819 A1 | 8/2005 | Johnson |
| 2006/0032915 A1 | 2/2006 | Schwartz |
| 2006/0074769 A1 | 4/2006 | Looney et al. |
| 2006/0089918 A1 | 4/2006 | Avanzi et al. |
| 2006/0200378 A1 | 9/2006 | Sorensen |
| 2006/0218057 A1 | 9/2006 | Fitzpatrick et al. |
| 2006/0251541 A1 | 11/2006 | Santandrea |

(Continued)

OTHER PUBLICATIONS

Kosba, et al, Personalized Hypermedia Presentation Techniques for Improving Online Customer Relationships, The Knowledge Engineering Review, vol. 16:2, 2001, pp. 111-155.*

(Continued)

*Primary Examiner* — Wilbert L Starks, Jr.
(74) *Attorney, Agent, or Firm* — Yee & Associates, P.C.; John R. Pivnichny

(57) ABSTRACT

A computer implemented method, apparatus, and computer usable program product for generating an expected behavior model. The process parses event data derived from video data to identify behavioral patterns, wherein the event data comprises metadata describing events occurring in a selected environment. The process analyzes the behavioral patterns to identify a set of expected behavioral patterns occurring in the environment, and generates the expected behavioral model using the expected behavioral patterns.

20 Claims, 4 Drawing Sheets

U.S. PATENT DOCUMENTS

| | | | |
|---|---|---|---|
| 2007/0008408 | A1 | 1/2007 | Zehavi |
| 2007/0052536 | A1 | 3/2007 | Hawkes et al. |
| 2007/0069014 | A1 | 3/2007 | Heckel et al. |
| 2007/0078759 | A1 | 4/2007 | Lilly et al. |
| 2007/0100649 | A1 | 5/2007 | Walker et al. |
| 2007/0112713 | A1 | 5/2007 | Seaman et al. |
| 2007/0244778 | A1 | 10/2007 | Bailard |
| 2007/0291118 | A1 | 12/2007 | Shu et al. |
| 2007/0294706 | A1 | 12/2007 | Neuhauser et al. |
| 2008/0004951 | A1 | 1/2008 | Huang et al. |
| 2008/0033752 | A1 | 2/2008 | Rodgers |
| 2008/0059282 | A1 | 3/2008 | Vallier et al. |
| 2008/0059297 | A1 | 3/2008 | Vallier et al. |
| 2008/0077493 | A1 | 3/2008 | Geffert |
| 2008/0114633 | A1 | 5/2008 | Wolf et al. |
| 2008/0147511 | A1 | 6/2008 | Edwards |
| 2008/0215391 | A1 | 9/2008 | Dowling et al. |
| 2008/0243626 | A1 | 10/2008 | Stawar et al. |
| 2008/0270172 | A1 | 10/2008 | Luff et al. |
| 2008/0270220 | A1 | 10/2008 | Ramer et al. |
| 2008/0270222 | A1 | 10/2008 | Goel |
| 2009/0037193 | A1 | 2/2009 | Vempati et al. |
| 2009/0083122 | A1* | 3/2009 | Angell et al. .................. 705/10 |
| 2009/0198625 | A1 | 8/2009 | Walker et al. |
| 2010/0023372 | A1 | 1/2010 | Gonzalez |
| 2010/0032482 | A1 | 2/2010 | Clark et al. |
| 2010/0169229 | A1 | 7/2010 | Lee |

OTHER PUBLICATIONS

Knüchel, et al, "A Learning-Based Approach for Anonymous Recommendation," Proceedings of the 8th IEEE International Conference on E-Commerce Technology and the 3rd IEEE International Conference on Enterprise Computing, E-Commerce, and E-Services (CEC/EEE'06), 2006, pp. 1-8.*

U.S. Appl. No. 11/861,520, filed Sep. 26, 2007, Angell et al.
U.S. Appl. No. 11/861,590, filed Sep. 26, 2007, Angell et al.
U.S. Appl. No. 11/861,729, filed Sep. 26, 2007, Angell et al.
U.S. Appl. No. 11/862,279, filed Sep. 27, 2007, Angell et al.
U.S. Appl. No. 11/862,294, filed Sep. 27, 2007, Angell et al.
U.S. Appl. No. 11/862,299, filed Sep. 27, 2007, Angell et al.
U.S. Appl. No. 11/862,306, filed Sep. 27, 2007, Angell et al.
U.S. Appl. No. 11/862,320, filed Sep. 27, 2007, Angell et al.
U.S. Appl. No. 11/862,323, filed Sep. 27, 2007, Angell et al.
U.S. Appl. No. 11/769,409, filed Jun. 27, 2007, Angell et al.
U.S. Appl. No. 11/861,528, filed Sep. 26, 2007, Angell et al.
U.S. Appl. No. 11/862,374, filed Sep. 27, 2007, Angell et al.
U.S. Appl. No. 11/861,966, filed Sep. 26, 2007, Angell et al.
U.S. Appl. No. 11/861,975, filed Sep. 26, 2007, Angell et al.
U.S. Appl. No. 11/695,983, filed Apr. 3, 2007, Angell et al.
U.S. Appl. No. 11/743,982, filed May 3, 2007, Angell et al.
U.S. Appl. No. 11/744,024, filed May 3, 2007, Angell et al.
U.S. Appl. No. 11/756,198, filed May 31, 2007, Angell et al.
U.S. Appl. No. 11/771,912, filed Jun. 29, 2007, Angell et al.
U.S. Appl. No. 11/764,524, filed Jun. 18, 2007, Angell et al.
U.S. Appl. No. 11/455,251, filed Jun. 16, 2006, Shu et al.
U.S. Appl. No. 11/771,252, filed Jun. 29, 2007, Angell et al.
USPTO office action for U.S. Appl. No. 11/861,590 dated Jun. 15, 2010.
USPTO office action for U.S. Appl. No. 11/861,729 dated Jun. 15, 2010.
USPTO office action for U.S. Appl. No. 11/862,306 dated Jun. 24, 2010.
USPTO office action for U.S. Appl. No. 11/695,983 dated Mar. 25, 2010.
USPTO office action for U.S. Appl. No. 11/861,520 dated May 6, 2010.
USPTO office action for U.S. Appl. No. 11/743,982 dated Mar. 24, 2010.
USPTO office action for U.S. Appl. No. 11/769,409 dated Apr. 4, 2010.
USPTO office action for U.S. Appl. No. 11/756,198 dated Apr. 22, 2010.
USPTO office action for U.S. Appl. No. 11/771,252 dated May 5, 2010.
USPTO office action for U.S. Appl. No. 11/764,524 dated Apr. 15, 2010.
USPTO office action for U.S. Appl. No. 11/861,528 dated May 13, 2010.
USPTO office action for U.S. Appl. No. 11/771,912 dated Apr. 8, 2010.
Wu et al. "Vehicle Sound Signature Recognition by Frequency Vector Principal Component Analysis", IEEE Instrumentation and Measurement Technology Conference, May 18-20, 1998, pp. 429-434.
Ng, Cheuk-Fan, Satisfying shoppers psychological needs: From public market to cyber-mall, 2002, Journal of Environmental Psycology, 23 (2003) pp. 439-455.
USPTO office action for U.S. Appl. No. 11/862,320 dated Aug. 5, 2010.
USPTO office action for U.S. Appl. No. 11/743,982 dated Aug. 19, 2010.
USPTO final office action for U.S. Appl. No. 11/756,198 dated Aug. 31, 2010.
USPTO office action for U.S. Appl. No. 11/769,409 dated Aug. 31, 2010.
USPTO final office action for U.S. Appl. No. 11/861,528 dated Sep. 9, 2010.
USPTO office action for U.S. Appl. No. 11/862,374 dated Aug. 19, 2010.

* cited by examiner

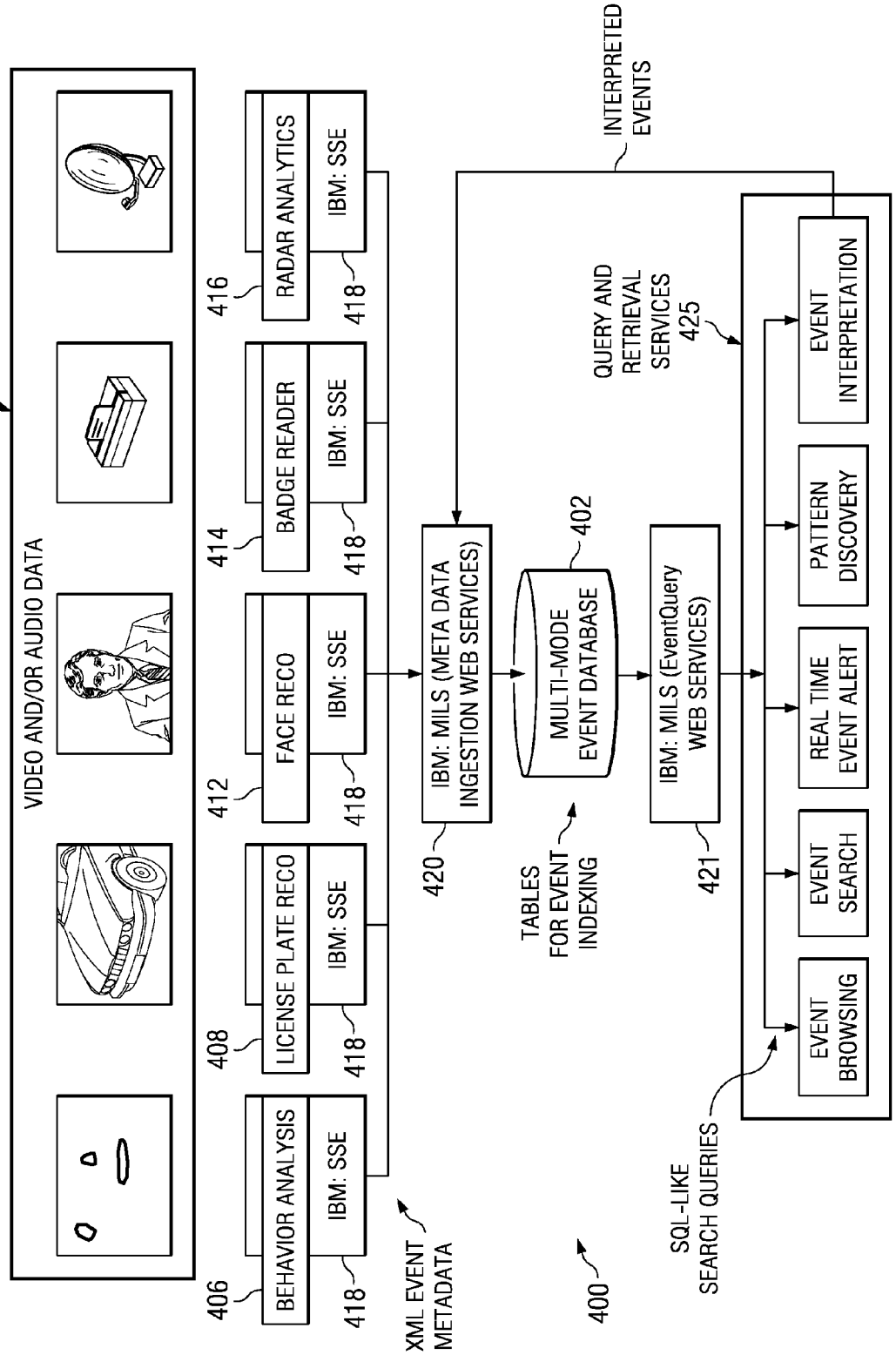

METHOD AND APPARATUS FOR IMPLEMENTING DIGITAL VIDEO MODELING TO GENERATE AN EXPECTED BEHAVIOR MODEL

CROSS-REFERENCE TO RELATED APPLICATIONS

The present invention is related to the application entitled Intelligent Surveillance System and Method for Integrated Event Based Surveillance, application Ser. No. 11/455,251 (filed Jun. 16, 2006), assigned to a common assignee, and which is incorporated herein by reference.

BACKGROUND OF THE INVENTION

1. Field of the Invention

The present invention relates generally to an improved data processing system, and in particular, to a computer implemented method and apparatus for generating data models. Still more particularly, the present invention relates to a computer implemented method, apparatus, and computer usable program product for utilizing digital video modeling to generate an expected behavior model for predicting behavior at selected locations.

2. Description of the Related Art

Behavior is any action a person or animal performs that can be observed and measured. Behavior is caused or influenced by environmental and biological variables. For example, an environmental variable is a variable that include temperature changes, availability of food, approval of peers, cultural customs, or other stimuli. Biological variables are variables that affect behavior and may include, for example, anatomical structures and limitations, normal physiological processes, and anomalies in anatomy and physiology due to injury or disease.

Behavior may be viewed as an expected pattern of events. In other words, the existence or change of certain variables or stimuli may generate the same behavior in most subjects. For example, subjects that come into contact with a flame instinctively withdraw from the flame. This behavior may be viewed as a simple, yet expected pattern of events: contact with a flame results in a subsequent withdrawal.

Behavioral analysis is the study of behavior. As in other experimental sciences, research is usually classified as basic or applied. In behavior analysis, basic research attempts to identify principles underlying behavior change. Applied research attempts to identify effective ways of dealing with or altering behavior. The application behavior analysis is very broad, ranging from assisting individuals in overcoming addictions to improving revenue in retail environments.

The process of behavioral analysis involves gathering a sufficient amount of data about environmental and/or biological variables and associated behavior so that expected patterns of behavior may be identified. In most instances, of behavioral analysis is performed in a controlled environment where behavioral analysts are able to focus on the effect of certain definable variables. However, such a process has limited practical utility because such testing conditions almost never exist outside the controlled environment.

The observation of subjects in a natural environment as opposed to a controlled environment also has limitations in behavioral analysis. For example, behavioral analysts may not be able to adequately consider or identify each and every variable that may affect a subject's behavior. Further, to gather a sufficient amount of data for identifying expected behavior requires behavior analysts to spend large amounts of time observing and studying subjects interacting with their environment.

Thus, the currently used methods for gathering data for use in identifying expected behavioral patterns may fail to identify a sufficient amount of information to enable a robust and accurate analysis of behavior. In addition, the currently used methods may fail to identify all the possible variables that affect behavior, limiting the usefulness of the results obtained.

SUMMARY OF THE INVENTION

The illustrative embodiments described herein provide a computer implemented method, apparatus, and computer usable program product for generating an expected behavior model. The process parses event data derived from video data to identify behavioral patterns, wherein the event data comprises metadata describing events occurring in a selected environment. The process analyzes the behavioral patterns to identify a set of expected behavioral patterns occurring in the environment, and generates the expected behavioral model using the expected behavioral patterns.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram of a smart detection system for generating event data in accordance with a preferred embodiment of the present invention;

DETAILED DESCRIPTION OF THE PREFERRED EMBODIMENT

Figure 1:
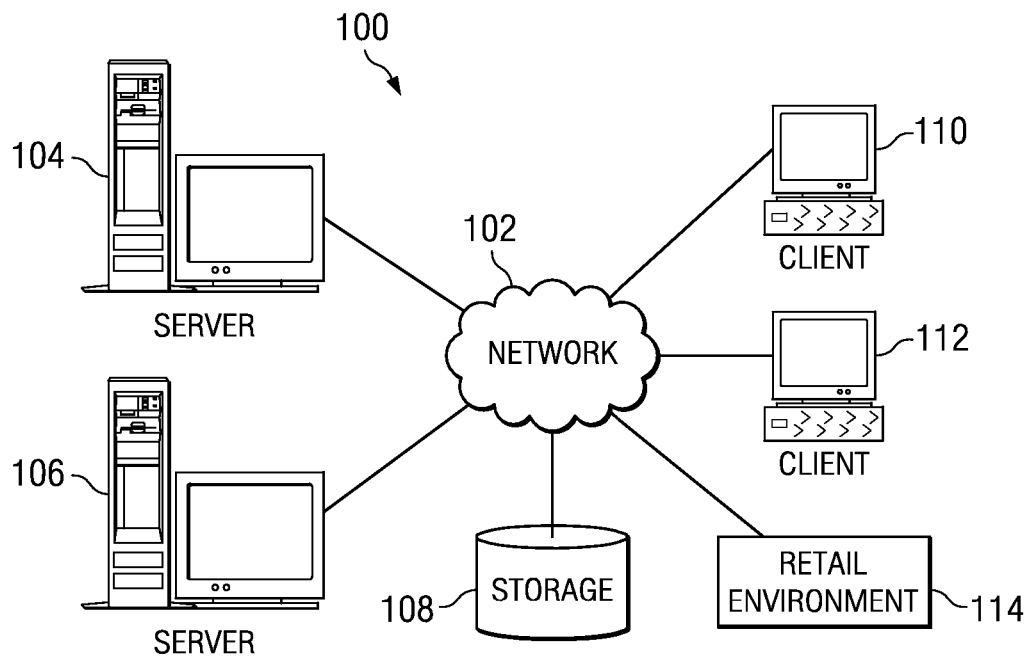
FIG. 1 is a pictorial representation of a network data processing system in which illustrative embodiments may be implemented.
Figure 2:
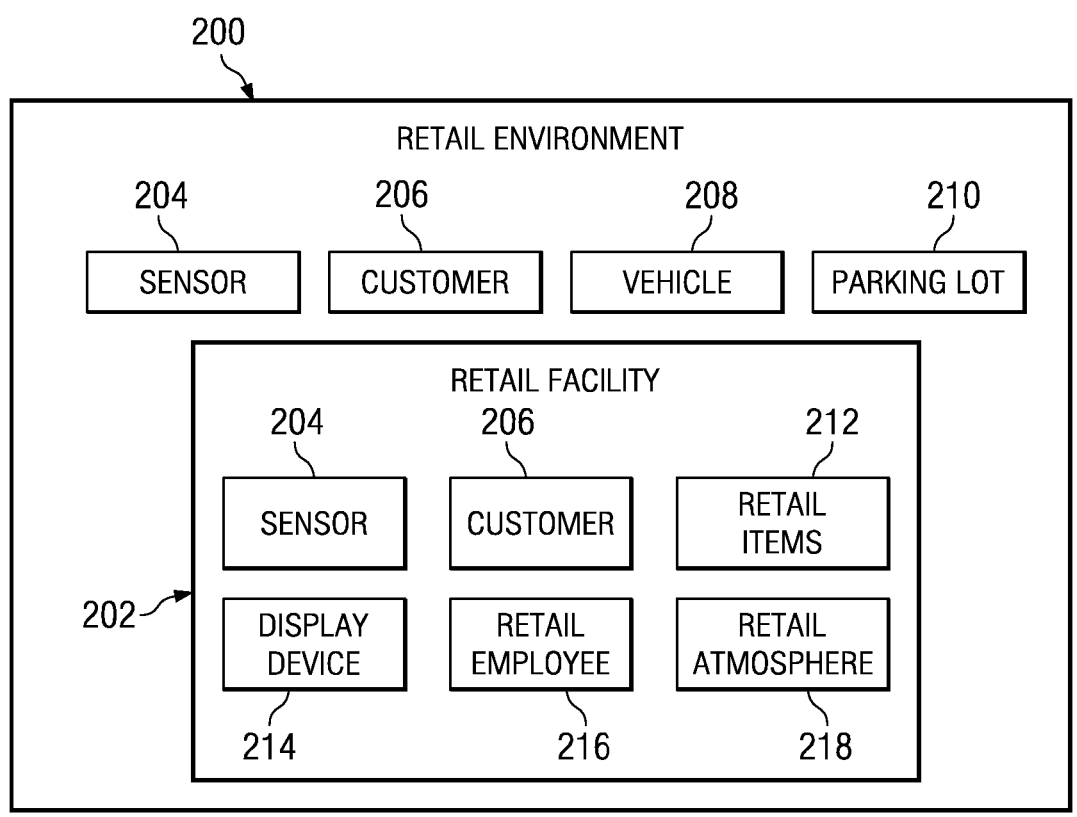
FIG. 2 is a simplified block diagram of a retail environment in which a set of sensors may be deployed in accordance with an illustrative embodiment.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections such as wire, wireless communication links, or fiber optic cables.

In the depicted example, server 104 and server 106 connect to network 102 along with storage 108. In addition, clients 110 and 112 connect to network 102. Clients 110 and 112 may be, for example, personal computers or network computers. In the depicted example, server 104 provides data, such as boot files, operating system images, and applications to clients 110 and 112. Clients 110 and 112 are clients to server 104 in this example. Network data processing system 100 may include additional servers, clients, and other computing devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 may also be implemented as a number of different types of networks, such as for example, an intranet, a local area network (LAN), or a wide area network (WAN). FIG. 1 is intended as an example, and not as an architectural limitation for the different illustrative embodiments.

In this illustrative example, network data processing system 100 also includes retail environment 114. Retail environment 114 is an environment in which customers may view, select order, and/or purchase one or more items. Retail environment 114 may include one or more facilities, buildings, or other structures for wholly or partially containing the items. A facility may include, but is not limited to, a grocery store, a clothing store, a marketplace, a retail department store, a convention center, a superstore, or any other type of structure for housing, storing, displaying, and/or selling items.

Items in retail environment 114 may include, but are not limited to, comestibles, clothing, shoes, toys, cleaning products, household items, machines, any type of manufactured items, entertainment and/or educational materials, as well as entrance or admittance to attend or receive an educational or entertainment service, activity, or event. Items for purchase could also include services, such as, without limitation, ordering dry cleaning services, food delivery, or any other services.

Comestibles include solid, liquid, and/or semi-solid food and beverage items. Comestibles may be, but are not limited to, meat products, dairy products, fruits, vegetables, bread, pasta, pre-prepared or ready-to-eat items, as well as unprepared or uncooked food and/or beverage items. For example, a comestible could include, without limitation, a box of cereal, a steak, tea bags, a cup of tea that is ready to drink, popcorn, pizza, candy, or any other edible food or beverage items.

An entertainment or educational activity, event, or service may include, but is not limited to, a sporting event, a music concert, a seminar, a convention, a movie, a ride, a game, a theatrical performance, and/or any other performance, show, or spectacle for entertainment or education of customers. For example, entertainment or educational activity, or event could include, without limitation, the purchase of seating at a football game, purchase of a ride on a roller coaster, purchase of a manicure, or purchase of admission to view a film.

Retail environment 114 may also include a parking facility for parking cars, trucks, motorcycles, bicycles, or other vehicles for conveying customers to and from retail environment 114. A parking facility may include an open air parking lot, an underground parking garage, an above ground parking garage, an automated parking garage, and/or any other area designated for parking customers' vehicles.

For example, retail environment 114 may be, but is not limited to, a grocery store, a retail store, a department store, an indoor mall, an outdoor mall, a combination of indoor and outdoor retail areas, a farmer's market, a convention center, a sports arena or stadium, an airport, a bus depot, a train station, a marina, a hotel, fair grounds, an amusement park, a water park, a casino, a bank, a hospital, and/or a zoo.

Retail environment 114 includes shelves, displays, racks, cases, refrigeration units, freezer units, hot boxes, and other containers for storing items. Items may be displayed on shelves, displays, racks, cases, refrigeration units, freezer units, hot boxes, and other containers as part of a marketing strategy. For example, items may be placed on a display at the end of an aisle as part of a marketing strategy to increase the likelihood that a group of customers will purchase the items.

FIG. 1 is intended as an example, and not as an architectural limitation for different embodiments. Network data processing system 100 may include additional servers, clients, data storage devices, and/or other devices not shown. For example, server 104 may also include devices not depicted in FIG. 1, such as, without limitation, a local data storage device. A local data storage device could include a hard disk, a flash memory, a non-volatile random access memory (NVRAM), a read only memory (ROM), and/or any other type of device for storing data.

FIG. 2 depicts a simplified block diagram of a retail environment in which illustrative embodiments may be implemented. In this illustrative embodiment in FIG. 2, retail environment 200 is a retail environment such as retail environment 114 in FIG. 1. Illustrative embodiments may also be implemented in non-retail environments. For example, illustrative embodiments may be implemented in any selected environment, such as a home, a school, a beach, an airplane, or any other location visited by people. Thus, the retail facility described herein may be replaced with any location visited by people.

Retail environment 200 includes retail facility 202. Retail facility 202 is a retail facility for wholly or partially storing, enclosing, or displaying items or services for marketing, viewing, selection, order, and/or purchase by a customer. For example, retail facility 202 may be, without limitation, a retail store, a supermarket, a big box store, a superstore, a book store, a clothing store, or a shopping mall. However, retail facility 202 is not limited to retail stores. For example, retail facility 202 may also include, without limitation, a sports arena, an amusement park, a water-park, a convention center, or any other location at which items are sold or offered for sale to customers. In this example, retail facility 202 is a grocery store.

Sensor 204 is one or more devices for gathering data associated with customer 206 in retail environment 200 and retail facility 202. Customer 206 is one or more persons at retail facility 202 for the purpose of browsing for and purchasing retail items. The data associated with customer 206 may be used to identify patterns of behavior exhibited by customer 206 in retail facility 202, or similar environments, such as a retail facility in a different location. The patterns of behavior may be identified as expected patterns of behavior or unexpected patterns of behavior. Once identified, the patterns of behavior may be used to predict behavior and ultimately modify or manipulate a customer's behavior.

Sensor 204 is an example of sensors that may be located internally and externally to retail facility 202. Sensor 204 is operable to monitor customers before the customers enter retail facility 202, while they are moving throughout retail facility 202, and after customers leave retail facility 202. For example, sensor 204 may be mounted externally to retail facility 202 to monitor vehicle 208 pulling into parking lot 210. Further, sensor 204 may collect data regarding customer 206 as customer 206 is traveling from vehicle 208 to the interior of retail facility 202. In this example, sensor 204 may be mounted to light poles in parking lot 210, above a doorway or entrance to retail facility 202, or mounted to a roof of retail facility 202.

Sensor 204 is deployed throughout retail environment 200 for gathering event data about customer 206. Event data is data and metadata describing actions, events, or conditions affecting a person's behavior in a selected environment. In particular, event data includes audio and video data collected by from video cameras deployed throughout patient care environment 200. In this example in FIG. 2, event data describes actions, events, or conditions affecting a customer's behavior in a retail environment, such as retail environment 200. The event data is sent to the analysis server for additional processing to identify patterns of behavior in the events. For example, event data may describe a first customer pausing at a product display, a second customer slowing their pace at the same location, a third customer continuing down the aisle at a constant pace, and a fourth customer significantly slowing down at the same location. The analysis server analyzes these events to identify patterns of behavior indicating, for example, which variables may play a role in causing customers to slow down or pause at product display.

Sensor 204 may be any type of sensing device for gathering event data associated with the delivery of healthcare services at retail environment 200. Sensor 204 may include, without limitation, a camera, a motion sensor device, a sonar, a sound recording device, an audio detection device, a voice recognition system, a heat sensor, a seismograph, a pressure sensor, a device for detecting odors, scents, and/or fragrances, a radio frequency identification (RFID) tag reader, a global positioning system (GPS) receiver, and/or any other detection device for detecting a presence of a human, an animal, equipment, or a vehicle at retail environment 200.

A heat sensor may be any type of known or available sensor for detecting body heat generated by a human or animal. A heat sensor may also be a sensor for detecting heat generated by a vehicle, such as an automobile or a motorcycle.

A motion detector may include any type of known or available motion detector device. A motion detector device may include, but is not limited to, a motion detector device using a photo-sensor, a radar or microwave radio detector, or ultrasonic sound waves.

A motion detector using ultrasonic sound waves transmits or emits ultrasonic sounds waves. The motion detector detects or measures the ultrasonic sound waves that are reflected back to the motion detector. If a human, an animal, or other object moves within the range of the ultrasonic sound waves generated by the motion detector, the motion detector detects a change in the echo of sound waves reflected back. This change in the echo indicates the presence of a human, an animal, or other object moving within the range of the motion detector.

In one example, a motion detector device using a radar or microwave radio detector may detect motion by sending out a burst of microwave radio energy and detecting the same microwave radio waves when the radio waves are deflected back to the motion detector. If a human, an animal, or other object moves into the range of the microwave radio energy field generated by the motion detector, the amount of energy reflected back to the motion detector is changed. The motion detector identifies this change in reflected energy as an indication of the presence of a human, an animal, or other object moving within the motion detectors range.

A motion detector device, using a photo-sensor, detects motion by sending a beam of light across a space into a photo-sensor. The photo-sensor detects when a human, animal, or object breaks or interrupts the beam of light as the human, the animal, or the object moves in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

A pressure sensor detector may be, for example, a device for detecting a change in weight or mass associated with the pressure sensor. For example, if one or more pressure sensors are imbedded in a sidewalk, Astroturf, or floor mat, the pressure sensor detects a change in weight or mass when a human or an animal steps on the pressure sensor. The pressure sensor may also detect when a human or an animal steps off of the pressure sensor. In another example, one or more pressure sensors are embedded in a parking lot, and the pressure sensors detect a weight and/or mass associated with a vehicle when the vehicle is in contact with the pressure sensor. A vehicle may be in contact with one or more pressure sensors when the vehicle is driving over one or more pressure sensors and/or when a vehicle is parked on top of one or more pressure sensors.

A camera may be any type of known or available camera, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area.

Various lenses, filters, and other optical devices such as zoom lenses, wide angle lenses, mirrors, prisms and the like may also be used with image capture device to assist in capturing the desired view. Devices may be fixed in a particular orientation and configuration, or it may, along with any optical devices, be programmable in orientation, light sensitivity level, focus or other parameters. Programming data may be provided via a computing device, such as server 104 in FIG. 1.

A camera may also be a stationary camera and/or a non-stationary camera. A non-stationary camera is a camera that is capable of moving and/or rotating along one or more directions, such as up, down, left, right, and/or rotate about an axis of rotation. The camera may also be capable of moving to follow or track a person, animal, or object in motion. In other words, the camera may be capable of moving about an axis of rotation in order to keep a customer, retail employee, animal, or object within a viewing range of the camera lens. In this example, sensor 204 includes non-stationary digital video cameras.

Sensor 204 is coupled to or in communication with an analysis server on a data processing system, such as network data processing system 100 in FIG. 1. The analysis server is illustrated and described in greater detail in FIG. 5, below. The analysis server includes software for analyzing digital images and other data captured by sensor 204 to gather event data in retail environment 200.

The data collected by sensor 204 is sent to smart detection software. The smart detection software processes the information to form the event data. The event data includes data and metadata describing event data captured by sensor 204. The event data is sent to the analysis server for additional processing to identify patterns of behavior that occur in retail environment 200. Once patterns of behavior are identified, the patterns may be analyzed to further identify a set of expected behavioral patterns. The set of expected behavioral patterns are one or more patterns of behavior that are expected to occur based upon certain observable events, variables, or stimuli. For example, expected behavioral patterns in a grocery store may include a customer acquiring a shopping cart or shopping basket upon entering the store, stopping to view a display offering free retail items, or bringing ten items or less to an express checkout lane.

A pattern of behavior may be considered expected if the probability of its occurrence reaches or exceeds a certain threshold. For example, if greater than 50% of all customers in a grocery store acquire a shopping cart or shopping basket upon entering a grocery store, then such behavior would be deemed expected if the threshold were set to 50%. In addition, a pattern of behavior may be considered expected if the pattern of behavior exceeds a threshold number. For example, if more than one hundred people have been observed exhibiting a particular behavior, then that pattern of behavior may be deemed expected. The manner in which a pattern of behavior is determined to be expected may vary without departing from the illustrative embodiments presented herein.

The expected behavioral patterns may be used to generate an expected behavioral model describing behavior considered the norm for a selected location. Knowledge of expected patterns of behavior may then be used to modify behavior for a particular purpose. For example, customer behavior in a retail environment may be modified to increase the amount of purchases that the customer is willing to make.

Retail items 212 are items of merchandise for sale. Retail items 212 may be displayed on a display shelf (not shown) located in retail facility 202. Other items of merchandise that may be for sale, such as food, beverages, shoes, clothing, household goods, decorative items, or sporting goods, may be hung from display racks, displayed in cabinets, on shelves, or in refrigeration units (not shown). Any other type of merchandise display arrangement known in the retail trade may also be used in accordance with the illustrative embodiments.

For example, display shelves or racks may include, in addition to retail items 212, various advertising displays, images, or postings. A multimedia display device attached to a data processing system may also be included. The images shown on the multimedia display may be changed in real time in response to various events, such as the time of day and the day of the week. In addition, the images shown on the multimedia display may change according to particular behavior patterns exhibited by a customer. For example, a customer exhibiting behavior associated with frugal shopping may be presented a coupon on a multimedia display to encourage a purchase.

Retail items 212 may be viewed or identified using an image capture device, such as a camera or other detector in sensor 204. Retail items 212 may be identified by a software application for tracking and identifying people, items, and objects within retail facility 202. Additionally, to facilitate identification, an item may have attached identification tags (not shown). Identification tags are tags associated with one or more retail items, customers, or employees for identification and tracking. For example, identification tags may be, without limitation, a bar code pattern, such as a universal product code (UPC) or European article number (EAN), a radio frequency identification (RFID) tag, or other optical identification tag, depending on the capabilities of the image capture device and associated data processing system to process the information and make an identification of retail items 212.

Display device 214 is one or more devices for displaying marketing messages to customers. For example, display device 214 may be a multimedia device capable of presenting a text, a graphic, an audio, a video, and/or any combination of text, graphics, audio, and video to a customer. For example, display device 214 may be, without limitation, a computer display screen, a laptop computer, a tablet personal computer (PC), a video display screen, a digital message board, a monitor, a kiosk, a personal digital assistant (PDA), and/or a cellular telephone with a display screen. Display device 214 may be one or more display devices located within retail facility 202 for use and/or viewing by one or more customers.

In this example, display device 214 is located inside retail facility 202. However, display device 214 may also be located outside retail facility 202. As such, display device 214 may be devices, such as display screens, electronic signs, PDAs, or kiosks, located in a parking lot, queue line, or other area outside of retail facility 202. Display devices deployed outside retail facility 202 may be used in the absence of display device 214 inside retail facility 202 or in addition to display device 214 located inside retail facility 202.

In other embodiments, display device 214 may be a display rack or shelf decorated in a manner to present marketing information to a customer of retail facility 202. In addition, display device 214 may be, for example, a banner identifying items on sale in retail facility 202. Further, display device 214 may also be a sticker, a coupon dispenser, or any other devices or object that may present marketing information to customer 206.

Sensor 204 may also be used to monitor retail employee 216. Retail employee 216 is a person employed at retail facility 202. Retail employee 216 may be, for example, a janitor, a cashier, a manager, a store director, a customer service representative, or any other employee working at retail facility 202. Sensor 204 may gather data for use in determining behavioral patterns of retail employee 216, or determining behavioral patterns of customer 206 because of interaction with retail employee 216.

Sensor 204 also collects event data associated with retail atmosphere 218. Retail atmosphere 218 is the ambient conditions within retail facility 202. For example, the ambient conditions may include the temperature, the humidity, the lighting conditions, the type of music playing, the existence of odors, the floor plan, the location of retail items, or any other observable condition that may affect the behavior of people within retail facility 202.

The data processing system, discussed in greater detail in FIG. 3 below, includes associated memory, which may be an integral part, such as the operating memory, of the data processing system or externally accessible memory. Software for tracking objects may reside in the memory and run on the processor. The software in the data processing system keeps a list of all customers, sensors, retail items, display devices, employees, or any other object or events of interest in retail facility 202. For example, the software is capable of tracking customer 206 as they travel through retail facility 202 and interact with other customers, retail employees, retail items, and display devices.

The software in the data processing system keeps a list of objects and events occurring in retail environment 200. The list is stored in a database. The database may be any type of database such as a spreadsheet, a relational database, a hierarchical database or the like. The database may be stored in the operating memory of the data processing system, externally on a secondary data storage device, locally on a recordable medium such as a hard drive, floppy drive, CD ROM, DVD device, remotely on a storage area network, such as storage 108 in FIG. 1, or in any other type of storage device.

The list is updated frequently enough to maintain a dynamic, accurate, real time listing of the people and objects within retail facility 202. Further, the list maintains a real time listing of the events occurring within retail facility 202. Thus, at any given time, the behavioral patterns of people located within retail facility 202 may be predicted based upon the occurrence or omission of events.

The aspects of the illustrative embodiments may also be used to track multiple customers simultaneously. In this case, the analysis server will store a separate listing for each customer within retail facility 202. As noted above, the listing may be stored in a database. The information contained within the listings may be accessed in response to a query. For example, a store director or a marketing manager may access the listing to plan marketing strategies.

Thus, in one embodiment, customer 206 entering retail facility 202 is detected by one or more sensors, such as sensor 204. Customer 206 may be identified and monitored. Once the customer has been verified, the data processing system retrieves past purchase history, total potential wallet-share, shopper segmentation information, customer profile data, granular demographic data for the customer, and/or any other available customer data elements using known or available data retrieval and/or data mining techniques. Thereafter, an analysis server in a data processing system associated with retail facility 202 begins performing data mining on available customer profile information and demographic information for use in generating an expected behavior model.

Once the expected behavior model has been generated, a behavior control strategy may be formulated and implemented to influence, control, or modify the customer's behavior. A behavior control strategy is a plan defining an action or a course of action for responding to a pattern of expected behavior. The action may include the generation of a notification, a dispersal of an odor, or any other action that may be used to respond to or reinforce the exhibition of an expected behavioral pattern. Thus, if the expected behavior model indicates that the buttery smell of popcorn results in customers purchasing greater amounts of popcorn, then the behavior control strategy may instruct an odor dispersal system to release a buttered popcorn odor to customers in the snack aisle.

The behavior control strategy may present the customer with marketing messages on one or more display devices. In another example, the behavioral control strategy may activate a dispersal device for releasing or dispersing an odor-producing chemical into the air or onto a surface, such as, without limitation, an aerosol spray, a vaporizer, or any other dispersal device. An odor-producing chemical may include any natural or artificial odor-producing chemical. An odor-producing chemical may include, without limitation, an artificial perfume, a natural popcorn smell, a citrus smell, an artificial pheromone, a floral smelling substance produced by flowers and other plants, and/or any other chemical or substance that gives off a scent. In this example, the dispersal device may be used to release pleasing or relaxing smells into the air to encourage customers to feel comfortable, improve customers' shopping experience, cause a customer to crave a particular food item, and/or increase the overall sales by customers.

Figure 3:
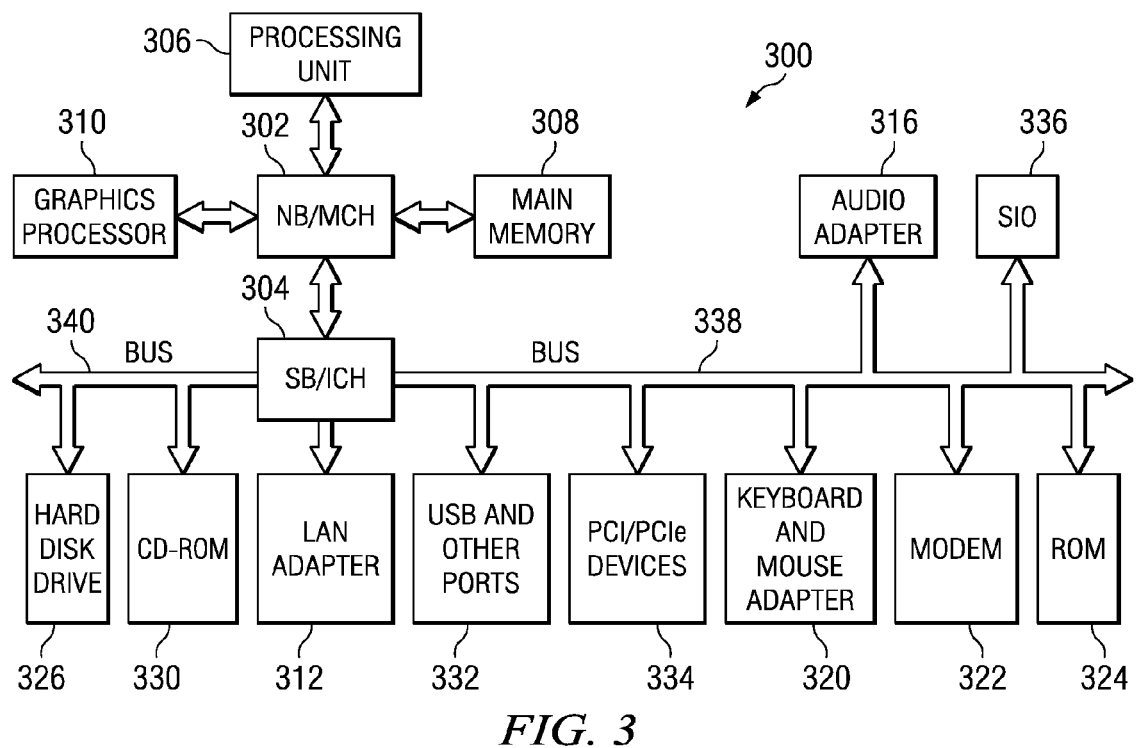
FIG. 3 is a block diagram of a data processing system in which the illustrative embodiments may be implemented.

With reference now to FIG. 3, a block diagram of a data processing system is shown in which illustrative embodiments may be implemented. Data processing system 300 is an example of a computer, such as server 104, client 110, or retail environment 114 in FIG. 1, in which computer usable program code or instructions implementing the processes may be located for the illustrative embodiments.

In the depicted example, data processing system 300 employs a hub architecture including a north bridge and memory controller hub (NB/MCH) 302 and a south bridge and input/output (I/O) controller hub (SB/ICH) 304. Processing unit 306, main memory 308, and graphics processor 310 are coupled to north bridge and memory controller hub 302. Processing unit 306 may contain one or more processors and may even be implemented using one or more heterogeneous processor systems. Graphics processor 310 may be coupled to the NB/MCH 302 through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) and other ports 332, and PCI/PCIe devices 334 are coupled to south bridge and I/O controller hub 304 through bus 338, and hard disk drive (HDD) 326 and CD-ROM 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the JAVA™ programming system, may run in conjunction with the operating system and provides calls to the operating system from JAVA™ programs or applications executing on data processing system 300. JAVA™ and all JAVA™-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

In some illustrative examples, data processing system 300 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. Memory may be, for example, main memory 308 or a cache such as found in north bridge and memory controller hub 302. A processing unit may include one or more processors or CPUs.

The depicted examples in FIGS. 1-3 are not meant to imply architectural limitations. The hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system.

A director, a marketing manager, or any other employee associated with retail environment 114 in FIG. 1 would prefer to have enough information about customers and/or employees to predict patterns of behavior. Once behavior can be predicted, behavior may be modified or controlled by changing certain environmental variables, for example. Therefore, the aspects of the illustrative embodiments recognize that it is advantageous for a manager or a director of the retail facility to have an expected behavior model that takes into account as much information regarding customers, retail employees, events, objects, and conditions at a retail facility.

Therefore, the illustrative embodiments described herein provide a computer implemented method, apparatus, and computer usable program product for generating an expected behavior model. The process parses event data derived from video data to identify behavioral patterns, wherein the event data comprises metadata describing events occurring in a selected environment. The process analyzes the behavioral patterns to identify a set of expected behavioral patterns occurring in the environment, and generates the expected behavioral model using the expected behavioral patterns.

It will be appreciated by one skilled in the art that the words "optimize", "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

Event data is data and metadata describing events, actions, conditions, or locations at a retail facility or other selected location. For example, event data could include, but is not limited to, a location at which customers tend to congregate or loiter, a location at which customers tend to walk at a faster pace, a location on store shelves at which customers tend to linger or stare for a more prolonged period than other areas, an area of the store that customers tend to ignore or neglect, an area of the store in which customers frequently search for customer service or store employees to get assistance, an area of the store in which children tend to wait, play, dwell, loiter, and/or any other data describing events, actions, or conditions in the retail facility.

Event data is processed to generate an expected behavior model. An expected behavior model provides information about a subject's behavior in a selected environment. Once formulated, the expected behavior model may be used to identify, predict, modify, or control behavior. Behavior may be modified or controlled by using the expected behavior model to create a behavior control strategy. The behavior control strategy may include suggested changes in environmental variables to elicit a desired behavior from the subject. For example, in a restaurant, a behavior control strategy may include suggestions regarding the alteration of ambient conditions, such as light and temperature, to prevent patrons from lingering at a table after their meal is finished. In a grocery store environment, a behavior control strategy may include suggestions on how to place items in the store to keep customers in the store longer or cause customers to purchase more retail items.

Further, the behavior control strategy may include an action to display a new product at the end of an aisle where the product will be more visible to customers, display an item on a shelf at eye level, play a particular type of music over a sound system, play music or other audio content at a particular volume over the sound system, adjust the lighting in an area of the retail facility to a particular brightness level, release a particular type and/or amount of an odor-causing chemical at a particular location in the retail facility, move a display device or store shelf to a particular location in the retail facility, and/or any other action to improve or optimize marketing efforts. An odor-causing chemical could include, without limitation, perfumes, artificial pheromones, natural scents, and/or artificial scents, such as, without limitation, the smell of popcorn.

Processing or parsing the event data to generate the expected behavior model may include, but is not limited to, formatting the event data for utilization and/or analysis in one or more data models, combining the event data with external data and/or internal data, comparing the event data to a data model and/or filtering the event data for relevant data elements to form the dynamic data.

As used herein, the term "set" includes one or more. For example, a set of motion detectors may include a single motion detector or two or more motion detectors. In one embodiment, the detectors include a set of one or more cameras located internally to a retail facility. Video images received from the set of cameras are used for gathering event data used to create the expected behavior model at the retail facility.

Event data collected from a set of sensors in a detection system is used to generate the expected behavior model. The event data may be processed to form dynamic data. Dynamic data is data relating to customers, employees, or other subjects that is gathered and analyzed in real time. Dynamic data is data that has been processed or filtered for analysis in a data model. For example, a data model may not be capable of analyzing raw, or unprocessed video images captured by a camera. The video images may need to be processed into data and/or metadata describing the contents of the video images before a data model may be used to organize, structure, or otherwise manipulate data and/or metadata. The video images converted to data and/or metadata that is ready for processing or analysis in a set of data models is an example of dynamic data.

The dynamic data is analyzed using one or more data models in a set of data models to identify patterns of behavior exhibited by subjects in a retail facility. The patterns of behavior may include, for example, the motions or actions performed by a customer in response to the various environmental variables presented to or experienced by the customer. The patterns of behavior may be further analyzed and/or processed in one or more data models in the set of data models to generate the expected behavior model.

A set of data models includes one or more data models. A data model is a model for structuring, defining, organizing, imposing limitations or constraints, and/or otherwise manipulating data and metadata to produce a result. A data model may be generated using any type of modeling method or simulation including, but not limited to, a statistical method, a data mining method, a causal model, a mathematical model, a behavioral model, a psychological model, a sociological model, or a simulation model.

Turning now to FIG. 4, a diagram of a smart detection system is depicted in accordance with an illustrative embodiment. System 400 is a system, such as network data processing system 100 in FIG. 1. System 400 incorporates multiple independently developed event analysis technologies in a common framework. An event analysis technology is a collection of hardware and/or software usable to capture and analyze event data. For example, an event analysis technology may be the combination of a video camera and facial recognition software. Images of faces captured by the video camera are analyzed by the facial recognition software to identify the subjects of the images.

Smart detection, also known as smart surveillance, is the use of computer vision and pattern recognition technologies to analyze detection data gathered from situated cameras and microphones. The analysis of the detection data generates events of interest in the environment. For example, an event of interest at a departure drop off area in an airport includes "cars that stop in the loading zone for extended periods of time". As smart detection technologies have matured, they have typically been deployed as isolated applications which provide a particular set of functionalities.

Smart detection system 400 is a smart detection system architecture for analyzing video images captured by a camera and/or audio captured by an audio detection device. Smart detection system 400 includes software for analyzing audio/video data 404. In this example, smart detection system 400 processes audio/video data 404 for a customer or retail employee into data and metadata to form query and retrieval services 425. Smart detection system 400 may be implemented using any known or available software for performing voice analysis, facial recognition, license plate recognition, and sound analysis. In this example, smart detection system 400 is implemented as IBM® smart surveillance system (S3) software.

An audio/video capture device is any type of known or available device for capturing video images and/or capturing audio. The audio/video capture device may be, but is not limited to, a digital video camera, a microphone, a web camera, or any other device for capturing sound and/or video images. For example, the audio/video capture device may be implemented as sensor 204 in FIG. 2.

Video and/or audio data 404 is detection data captured by the audio/video capture devices. Video and/or audio data 404 may be a sound file, a media file, a moving video file, a media file, a still picture, a set of still pictures, or any other form of image data and/or audio data. Video and/or audio data 404 may also be referred to as detection data. Video and/or audio data 404 may include images of a customer's face, an image of a part or portion of a customer's car, an image of a license plate on a customer's car, and/or one or more images showing a customer's behavior. An image showing a customer's behavior or appearance may show a customer wearing a long coat on a hot day, a customer walking with two small children which may be the customer's children or grandchildren, a customer moving in a hurried or leisurely manner, or any other type of behavior or appearance attributes of a customer, a customer's companions, or a customer's vehicle.

In this example, smart detection system 400 architecture is adapted to satisfy two principles. 1) Openness: The system permits integration of both analysis and retrieval software made by third parties. In one embodiment, the system is designed using approved standards and commercial off-the-shelf (COTS) components. 2) Extensibility: The system should have internal structures and interfaces that will permit the functionality of the system to be extended over a period of time.

The architecture enables the use of multiple independently developed event analysis technologies in a common framework. The events from all these technologies are cross indexed into a common repository or multi-mode event database 402 allowing for correlation across multiple audio/video capture devices and event types.

Smart detection system 400 includes the following illustrative technologies integrated into a single system. License plate recognition technology 408 may be deployed at the entrance to a facility where license plate technology 408 catalogs a license plate of each of the arriving and departing vehicles in a parking lot associated with the retail facility.

Behavior analysis technology 406 detects and tracks moving objects and classifies the objects into a number of pre-defined categories. As used herein, an object may be a human customer, an item, a container, a shopping cart or a shopping basket, or any other object inside or outside the retail facility. Behavior analysis technology 406 could be deployed on various cameras overlooking a parking lot, a perimeter, or inside a facility.

Face recognition technology 412 may be deployed at entry ways to capture and recognize faces. Badge reading technology 414 may be employed to read badges. Radar analytics technology 416 may be employed to determine the presence of objects.

Events from access control technologies can also be integrated into smart detection system 400. The data gathered from behavior analysis technology 406, license plate recognition 408, Face recognition technology 412, badge reader technology 414, radar analytics technology 416, and any other video/audio data received from a camera or other video/audio capture device is received by smart detection system 400 for processing into query and retrieval services 425.

The events from all the above surveillance technologies are cross indexed into a single repository, such as multi-mode event database 402. In such a repository, a simple time range query across the modalities will extract license plate information, vehicle appearance information, badge information, and face appearance information, thus permitting an analyst to easily correlate these attributes. The architecture of smart detection system 400 also includes one or more smart surveillance engines (SSEs) 418, which house event detection technologies.

Smart detection system 400 further includes middleware for large scale surveillance (MILS) 420 and 421, which provides infrastructure for indexing, retrieving, and managing event metadata.

In this example, audio/video data 404 is received from a variety of audio/video capture devices, such as sensor 204 in FIG. 2, and processed in SSEs 418. Each SSE 418 can generate real-time alerts and generic event metadata. The metadata generated by SSE 418 may be represented using extensible markup language (XML). The XML documents include a set of fields which are common to all engines and others which are specific to the particular type of analysis being performed by SSE 418. In this example, the metadata generated by SSEs 418 is transferred to a backend MILS system 420. This may be accomplished via the use of, e.g., web services data ingest application program interfaces (APIS) provided by MILS 420. The XML metadata is received by MILS 420 and indexed into predefined tables in multi-mode event database 402. This may be accomplished using, for example, and without limitation, the DB2™ XML extender, if an IBM® DB2™ database is employed. This permits for fast searching using primary keys. MILS 421 provides a number of query and retrieval services 425 based on the types of metadata available in the database. The query and retrieval services 425 may include, for example, event browsing, event search, real time event alert, or pattern discovery event interpretation. Each event has a reference to the original media resource, such as, without limitation, a link to the video file. This allows a user to view the video associated with a retrieved event.

Smart detection system 400 provides an open and extensible architecture for smart video surveillance. SSEs 418 preferably provide a plug and play framework for video analytics. The event metadata generated by SSEs 418 may be sent to multi-mode event database 402 as XML files. Web services API's in MILS 420 permit for easy integration and extensibility of the metadata. Query and retrieval services 425, such as, for example, event browsing and real time alerts, may use structure query language (SQL) or similar query language through web services interfaces to access the event metadata from multi-mode event database 402.

The smart surveillance engine (SSE) 418 may be implemented as a C++ based framework for performing real time event analysis. SSE 418 is capable of supporting a variety of video/image analysis technologies and other types of sensor analysis technologies. SSE 418 provides at least the following support functionalities for the core analysis components. The support functionalities are provided to programmers or users through a plurality of interfaces employed by the SSE 418. These interfaces are illustratively described below.

Standard plug-in interfaces are provided. Any event analysis component which complies with the interfaces defined by SSE 418 can be plugged into SSE 418. The definitions include standard ways of passing data into the analysis components and standard ways of getting the results from the analysis components. Extensible metadata interfaces are provided. SSE 418 provides metadata extensibility. For example, consider a behavior analysis application which uses detection and tracking technology. Assume that the default metadata generated by this component is object trajectory and size. If the designer now wishes to add color of the object into the metadata, SSE 418 enables this by providing a way to extend the creation of the appropriate XML structures for transmission to the backend (MILS) system 420.

Real time alerts are highly application-dependent. For example, while a person loitering may require an alert in one application, the absence of a guard at a specified location may require an alert in a different application. The SSE provides an easy real time alert interfaces mechanism for developers to plug-in for application specific alerts. SSE 418 provides standard ways of accessing event metadata in memory and standardized ways of generating and transmitting alerts to the backend (MILS) system 420.

In many applications, users will need the use of multiple basic real time alerts in a spatio-temporal sequence to compose an event that is relevant in the user's application context. SSE 418 provides a simple mechanism for composing compound alerts via compound alert interfaces. In many applications, the real time event metadata and alerts are used to actuate alarms, visualize positions of objects on an integrated display and control cameras to get better surveillance data. SSE 418 provides developers with an easy way to plug-in actuation modules which can be driven from both the basic event metadata and by user defined alerts using real time actuation interfaces.

Using database communication interfaces, SSE 418 also hides the complexity of transmitting information from the analysis engines to the multi-mode event database 402 by providing simple calls to initiate the transfer of information.

The IBM Middleware for Large Scale Surveillance (MILS) 420 and 421 may include a J2EE™ frame work built around IBM's DB2™ and IBM WebSphere™ application server platforms. MILS 420 supports the indexing and retrieval of spatio-temporal event meta. MILS 420 also provides analysis engines with the following support functionalities via standard web service interfaces using XML documents.

MILS 420 and 421 provide metadata ingestion services. These are web service calls which allow an engine to ingest events into the MILS 420 and 421 system. There are two categories of ingestion services. 1) Index Ingestion Services This permits for the ingestion of metadata that is searchable through SQL like queries. The metadata ingested through this service is indexed into tables which permit content based searches, such as provided by MILS 420. 2) Event Ingestion Services: This permits for the ingestion of events detected in SSE 418, such as provided by MILS 421. For example, a loitering alert that is detected can be transmitted to the backend along with several parameters of the alert. These events can also be retrieved by the user but only by the limited set of attributes provided by the event parameters.

The MILS 420 and/or 421 provides schema management services. Schema management services are web services which permit a developer to manage their own metadata schema. A developer can create a new schema or extend the base MILS schema to accommodate the metadata produced by their analytical engine. In addition, system management services are provided by the MILS 420 and/or 421.

The schema management services of MILS 420 and 421 provide the ability to add a new type of analytics to enhance situation awareness through cross correlation. For example, an expected behavior model for a monitoring a retail environment is dynamic and may change over time. In addition, later-developed analytics may be better suited for gathering event data for a selected environment. Thus, it is important to permit smart detection system 400 to add new types of analytics and cross correlate the existing analytics with the new analytics. To add/register a new type of sensor and/or analytics to increase situation awareness, a developer can develop new analytics and plug them into an SSE 418, and employ MILS's schema management service to register new intelligent tags generated by the new SSE analytics. After the registration process, the data generated by the new analytics is immediately available for cross correlating with existing index data.

System management services provide a number of facilities needed to manage smart detection system 400 including: 1) Camera Management Services: These services include the functions of adding or deleting a camera from a MILS system, adding or deleting a map from a MILS system, associating a camera with a specific location on a map, adding or deleting views associated with a camera, assigning a camera to a specific MILS server and a variety of other functionalities needed to manage the system. 2) Engine Management Services: These services include functions for starting and stopping an engine associated with a camera, configuring an engine associated with a camera, setting alerts on an engine and other associated functionalities. 3) User Management Services: These services include adding and deleting users to a system, associating selected cameras to a viewer, associating selected search and event viewing capacities with a user and associating video viewing privilege with a user. 4) Content Based Search Services: These services permit a user to search through an event archive using a plurality of types of queries.

For the content based search services (4), the types of queries may include: A) Search by Time retrieves all events from query and retrieval services 425 that occurred during a specified time interval. B) Search by Object Presence retrieves the last 100 events from a live system. C) Search by Object Size retrieves events where the maximum object size matches the specified range. D) Search by Object Type retrieves all objects of a specified type. E) Search by Object Speed retrieves all objects moving within a specified velocity range. F) Search by Object Color retrieves all objects within a specified color range. G) Search by Object Location retrieves all objects within a specified bounding box in a camera view. H) Search by Activity Duration retrieves all events from query and retrieval services 425 with durations within the specified range. I) Composite Search combines one or more of the above capabilities. Other system management services may also be employed.

Figure 5:
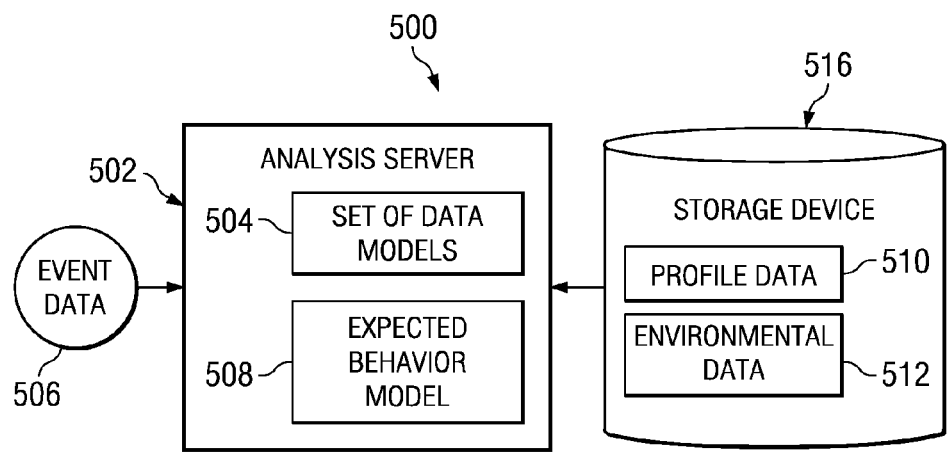
FIG. 5 is a block diagram of a data processing system for analyzing event data for identifying patterns of behavior for generating an expected behavior model in accordance with an illustrative embodiment.

Referring now to FIG. 5, a block diagram of a data processing system for analyzing event data to identify patterns of behavior for generating an expected behavior model is shown in accordance with an illustrative embodiment. Data processing system 500 is a data processing system, such as data processing system 100 in FIG. 1 and data processing system 300 in FIG. 3.

Analysis server 502 is any type of known or available server for analyzing data for use in generating an expected behavior model. Analysis server 502 may be a server, such as server 104 in FIG. 1 or data processing system 300 in FIG. 3. Analysis server 502 includes set of data models 504 for analyzing dynamic data elements and static data elements.

Static data elements are data elements that do not tend to change in real time. Examples of static data elements include, without limitation, a customer's name, address, and social security number. For example, Static data elements may be collected from administrative records, surveys, or databases.

Dynamic customer data elements are data elements that are changing in real time. For example, dynamic customer data elements could include, without limitation, the current contents of a customer's shopping basket, a time of day, a day of the week, whether it is a customer's birthday or other holiday observed by a customer, a customer's responses to marketing messages and/or items viewed by a customer, a customer location, and/or any other dynamic customer information. Event data is a dynamic customer data element. Dynamic data elements may be collected by sensors deployed at a retail facility, such as sensor 204 in FIG. 2. Dynamic data elements and static data elements may be combined to form dynamic data.

Set of data models 504 is one or more data models created a priori or pre-generated for use in analyzing event data 506 to identify patterns of behavior and generate expected behavior model 508. Set of data models 504 includes one or more data models for mining event data, identifying events and variables of interest, and determining patterns or relationships between the events and variables of interest. Set of data models 504 is generated using statistical, data mining, and simulation or modeling techniques. In this example, set of data models 504 includes, but is not limited to, a unifying data model, system data models, event data models, and/or user data models. These data models are discussed in greater detail in FIG. 6 below.

Event data 506 is data or metadata describing people, actions, and events occurring in the retail environment. Event data 506 is processed to form dynamic data. Dynamic data includes patterns of behavior of people within a retail environment. Processing event data 506 may include, but is not limited to, parsing event data 506 for relevant data elements, and combining event data 506 with other sources of data. In addition, processing event data 506 may include comparing event data 506 to baseline or comparison models, and/or formatting event data 506 for utilization and/or analysis in one or more data models in set of data models 504 to form the dynamic data. The processed event data 506 and any other data forms of dynamic data (not shown). The dynamic data, which includes patterns of behavior, is analyzed and/or further processed using one or more data models in set of data models 504 to generate expected behavior model 508.

Expected behavior model 508 is a model, set of definitions, suggestions, or parameters describing patterns of behavior of certain subjects in a selected environment. Expected behavior model 508 may describe expected patterns of behavior for an individual subject or for all subjects located at a selected environment. Expected behavior model 508 identifies the patterns of behavior as expected patterns of behavior upon detecting a trend or repetition of behavior in response to certain environmental or biological variables that cause the set of expected behavioral patterns. Thus, expected behavioral model 508 also associates a cause with the set of expected behavioral patterns. Once a cause is known, then introducing a specific cause at a later time may result in the exhibition of a pattern of expected behavior.

Expected behavior model 508 is generated through the continual collection and analysis of event data in a selected location. Application of the event data to particular individuals is more effective in identifying patterns of behavior. Thus, analysis server 502 utilizes profile data 510 in the generation of expected behavior model 508.

Profile data 510 is data regarding one or more customers. Profile data 510 includes point of contact data, profiled past data, current actions data, transactional history data, certain click-stream data, registration data, account data, and/or any other data regarding a customer. Registration data may include customer provided data regarding the customer, such as name, address, telephone number, email address, fax number, place of employment, or any other customer information.

Point of contact data is data regarding a method or device used by a customer to interact with a data processing system of a merchant or supplier. The customer may interact with the merchant or supplier using a computing device or display terminal having a user interface for inputting data and/or receiving output. The device or terminal may be a device provided by the retail facility and/or a device belonging to or provided by the customer. For example, the display or access device may include, but is not limited to, a cellular telephone, a laptop computer, a desktop computer, a computer terminal a kiosk, a personal digital assistant (PDA), or any other display or access device.

In the illustrative embodiments, a global profile includes data on the customer's interests, preferences, and affiliation. The profiled past may also comprise retrieving purchased data. Various firms provide data for purchase, which is grouped or keyed to presenting a lifestyle or a life stage view of customers by block, group or some other baseline parameter. The purchased data presents a view of the customer based on aggregation of data points, such as, but not limited to geographic block, age of head of household, income level, number of children, education level, ethnicity, and buying patterns.

The profiled past data may also include navigational data relating to the path the customer used to arrive at a web page, which indicates where the customer came from or the path the customer followed to link to the merchant or supplier's web page. Transactional data of actions taken is data regarding a transaction. For example, transaction data may include data regarding whether the transaction is a first time transaction or a repeat transaction, and/or how much the customer usually spends. Information on how much a customer generally spends during a given transaction may be referred to as basket share. Data voluntarily submitted by the customer in responding to questions or a survey may also be included in the profiled past Current actions, also called a current and historical record, are also included in profile data 510. Current actions are data defining customer behavior. One source of current actions is listings of the purchases made by the customer, payments and returns made by the customer, and/or click-stream data from a point of contact device of the customer. Click-stream data is data regarding a customer's navigation of an online web page of the merchant or supplier. Click-stream data may include page hits, sequence of hits, duration of page views, response to advertisements, transactions made, and conversion rates. Conversion rate is the number of times the customer takes action divided by the number of times an opportunity is presented.

Profile data 510 may also include data associated with a detailed demographics profile for one or more customers. The demographics profile may include information relating to, without limitation, ethnicity, block group, lifestyle, life stage, income, health, physiological conditions, and education data. Further, profile data 510 may also include psychographic data that provides an attitude profile of the customer. Examples of attitude profiles include a trend buyer or a time-strapped person who prefers to purchase a complete outfit, or a professional buyer who prefers to mix and match individual items from various suppliers.

Environmental data 512 is data relating to the environmental variables associated with the retail facility from which event data 506 is generated. Environmental data 512 includes, for example, information relating to the ambient conditions within retail facility 202 in FIG. 2. For example, the ambient conditions may include the temperature, the humidity, the lighting conditions, the type of music playing, the existence of odors, the floor plan, the location of retail items, or any other observable condition that may affect the behavior of people within the retail facility. Thus, an association between environmental variables and effects on behavior may be determined.

In this example, profile data 510 and environmental data 512 are stored in storage device 516. Storage device 516 is any local or remote data storage device. For example, storage device 516 may include storage 108 in FIG. 1 or read only memory (ROM) 324 and/or compact disk read only memory (CD-ROM) 330 in FIG. 3.

Figure 6:
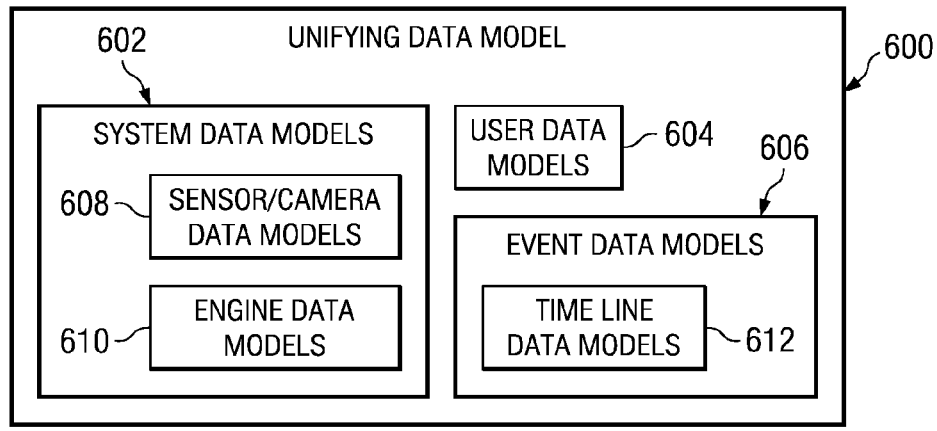
FIG. 6 is a block diagram of a unifying data model for processing event data in accordance with an illustrative embodiment.

Turning now to FIG. 6, a block diagram of a unifying data model for processing event data is depicted in accordance with an illustrative embodiment. The event data generated by a smart detection system may be processed by one or more data models in a set of data models, such as set of data models 504 in FIG. 5, to identify patterns in the events. Unifying data model 600 is an example of a data model for processing event data.

In this example, unifying data model 600 has three types of data models, namely, 1) system data models 602 which captures the specification of a given monitoring system, including details like geographic location of the system, number of cameras deployed in the system, physical layout of the monitored space, and other details regarding the retail environment and retail facility; 2) user data models 604 models users, privileges and user functionality; and 3) event data models 606, which captures the events that occur in a specific sensor or zone in the monitored space. Each of these data models is described below.

System data models 602 has a number of components. These may include a sensor/camera data models 608. The most fundamental component of this sensor/camera data models 608 is a view. A view is defined as some particular placement and configuration, such as a location, orientation, and/or parameters, of a sensor. In the case of a camera, a view would include the values of the pan, tilt and zoom parameters, any lens and camera settings, and position of the camera. A fixed camera can have multiple views. The view "Id" may be used as a primary key to distinguish between events being generated by different sensors. A single sensor can have multiple views. Sensors in the same geographical vicinity are grouped into clusters, which are further grouped under a root cluster. There is one root cluster per MILS server.

Engine data models 610 provide a comprehensive security solution which utilizes a wide range of event detection technologies. Engine data models 610 captures at least some of the following information about the analytical engines: Engine Identifier: A unique identifier assigned to each engine; Engine Type: This denotes the type of analytic being performed by the engine, for example face detection, behavior analysis, and/or LPR; and Engine Configuration: This captures the configuration parameters for a particular engine.

User data models 604 captures the privileges of a given user. These may include selective access to camera views; selective access to camera/engine configuration and system management functionality; and selective access to search and query functions.

Event data models 606 represents the events that occur within a space that may be monitored by one or more cameras or other sensors. Event data model may incorporate time line data models 612 for associating the events with a time. By associating the events with a time, an integrated event may be defined. An integrated event is an event that may include multiple sub-events. Time line data model 612 uses time as a primary synchronization mechanism for events that occur in the real world, which is monitored through sensors. The basic MILS schema allows multiple layers of annotations for a given time span.

Figure 7:
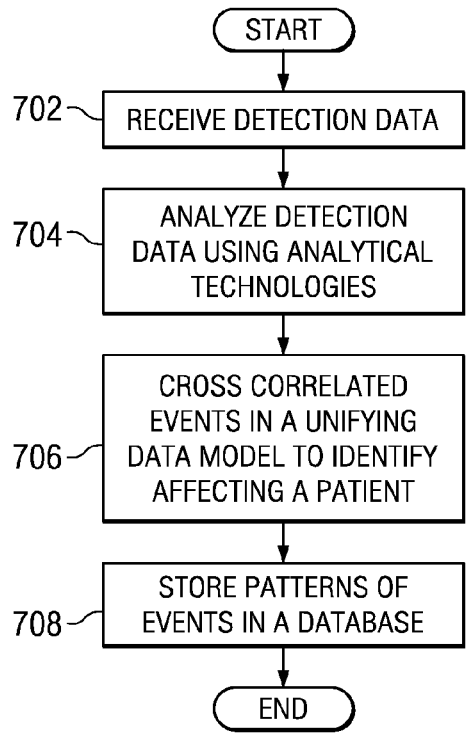
FIG. 7 is a block diagram of a data flow through a smart detection system in accordance with an illustrative embodiment.

Turning now to FIG. 7, a process for generating event data by a smart detection system is depicted in accordance with an illustrative embodiment. The process in FIG. 7 may be implemented by a smart detection system, such as smart detection system 400 in FIG. 4.

The process begins by receiving detection data from a set of cameras (step 702). The process analyses the detection data using multiple analytical technologies to detect events (step 704). The multiple technologies may include, for example, a behavior analysis engine, a license plate recognition engine, a face recognition engine, a badge reader engine, and/or a radar analytic engine.

Events are cross correlated in a unifying data model to identify patterns of events (step 706). Cross correlating provides integrated situation awareness across the multiple analytical technologies. The cross correlating may include correlating events to a time line to associate events to define an integrated event. The patterns of events are indexed and stored in a repository, such as a database (step 708) with the process terminating thereafter.

In the example in FIG. 7, the database can be queried to determine an integrated event that matches the query. This includes employing cross correlated information from a plurality of information technologies and/or sources. New analytical technologies also may be registered. The new analytical technologies can employ model and cross correlate with existing analytical technologies to provide a dynamically configurable surveillance system.

In this example, detection data is received from a set of cameras. However, in other embodiments, detection data may come from other detection devices, such as, without limitation, a badge reader, a microphone, a motion detector, a heat sensor, or a radar.

Figure 8:
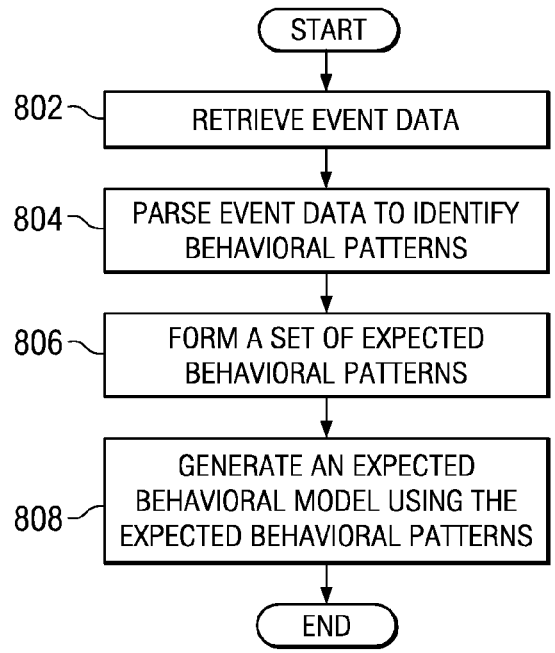
FIG. 8 is a level flowchart of a process for generating an expected behavior model in accordance with an illustrative embodiment.

Turning now to FIG. 8, a process for generating an expected behavior model is depicted in accordance with an illustrative embodiment. This process may be implemented by an analysis server, such as analysis server 502 in FIG. 5.

The process begins by retrieving event data (step 802). The event data may be retrieved from a data storage device, such as a relational database, a multi-modal database, or any other data storage device. The event data includes metadata describing events occurring at a retail facility.

The process then parses the event data to identify patterns of behavior (step 804). Next, the process analyzes the patterns of behavior to form a set of expected patterns of behavior (step 806). Subsequently, the process generates an expected behavioral model using the expected pattern of behavior (step 808) and the process terminates.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for generating an expected behavior model. The process parses event data derived from video data to identify behavioral patterns, wherein the event data comprises metadata describing events occurring in a selected environment. The process analyzes the behavioral patterns to identify a set of expected behavioral patterns occurring in the environment, and generates the expected behavioral model using the expected behavioral patterns.

Using the method and apparatus disclosed herein, an expected behavior model may be generated from a collection of dynamic data. The expected behavior model may then be used to generate a behavior control strategy to influence, manipulate, or modify the behavior of a person. Use of the expected behavior model may be directed to many different outcomes, such as, for example, increasing revenue at a retail facility, providing increased security in banks or casinos, or treating addictions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating an expected behavior model, the computer implemented method comprising:

parsing event data derived from video data associated with customers in a selected physical retail store location to identify behavioral patterns exhibited by the customers in the selected physical retail store location, wherein the event data comprises metadata describing events occurring in the selected physical retail store location that affect behavior of the customers in the selected retail store location;

analyzing the behavioral patterns exhibited by the customers in the selected physical retail store location to determine that occurrences of the behavioral patterns are greater than or equal to a predetermined threshold to identify a set of expected behavioral patterns of the customers occurring in the selected physical retail store location; and generating the expected behavioral model using the set of expected behavioral patterns.

2. The computer implemented method of claim 1, further comprising:

formulating a behavior control strategy that responds to a pattern of expected customer behavior in the selected physical retail store location using the expected behavioral model.

3. The computer implemented method of claim 2, wherein the behavior control strategy defines a course of action based on the set of expected behavioral patterns of the customers occurring in the selected physical retail store location.

4. The computer implemented method of claim 2, wherein the course of action is the behavior control strategy instructing an odor dispersal system to release a particular type of odor-producing chemical at a particular location in the selected physical retail store location.

5. The computer implemented method of claim 1, wherein the expected behavioral model associates a cause with the set of expected behavioral patterns of the customers occurring in the selected physical retail store location.

6. The computer implemented method of claim 5, wherein the cause associated with the set of expected behavioral patterns of the customers occurring in the selected physical retail store location is a biological variable.

7. The computer implemented method of claim 1, further comprising:

receiving the video data from a set of sensors associated with the selected physical retail store location; and analyzing the video data to identify event data, wherein analyzing the video data comprises generating the metadata describing the events occurring in the physical retail store location that affect behavior of the customers in the selected retail store location.

8. The computer implemented method of claim 7, wherein the set of sensors associated with the selected physical retail store location includes a set of non-stationary digital video cameras capable of moving about an axis of rotation to track customers in motion within the selected retail store location.

9. The computer implemented method of claim 7, wherein the set of sensors associated with the selected physical retail store location includes an odor detecting device.

10. The computer implemented method of claim 1, wherein parsing the event data further comprises:

processing the event data using at least one of a statistical method, a data mining method, a causal model, a mathematical model, a marketing model, a behavioral model, a psychological model, a sociological model, or a simulation model.

11. A computer program product comprising:

computer usable program code for generating an expected behavior model, the computer program product comprising:

computer usable program code for parsing event data derived from video data associated with customers in a selected physical retail store location to identify behavioral patterns exhibited by the customers in the selected physical retail store location, wherein the event data comprises metadata describing events occurring in the selected physical retail store location that affect behavior of the customers in the selected retail store location;

computer usable program code for analyzing the behavioral patterns exhibited by the customers in the selected physical retail store location to determine that occurrences of the behavioral patterns are greater than or equal to a predetermined threshold to identify a set of expected behavioral patterns of the customers occurring in the selected physical retail store location; and computer usable program code for generating the expected behavioral model using the set of expected behavioral patterns.

12. The computer program product of claim 11, further comprising:

computer usable program code for formulating a behavior control strategy that responds to a pattern of expected customer behavior in the selected physical retail store location using the expected behavioral model.

13. The computer program product of claim 12, wherein the behavior control strategy defines a course of action based on the set of expected behavioral patterns of the customers occurring in the selected physical retail store location.

14. The computer program product of claim 11, wherein the expected behavioral model associates a cause with the set of expected behavioral patterns of the customers occurring in the selected physical retail store location.

15. The computer program product of claim 14, wherein the cause associated with the set of expected behavioral patterns of the customers occurring in the selected physical retail store location is a biological variable.

16. The computer program product of claim 11, further comprising:

computer usable program code for receiving the video data from a set of sensors associated with the selected physical retail store location; and computer usable program code for analyzing the video data to identify event data, wherein analyzing the video data comprises generating the metadata describing the events occurring in the physical retail store location that affect behavior of the customers in the selected retail store location.

17. The computer program product of claim 16, wherein the set of sensors associated with the selected physical retail store location includes a set of non-stationary digital video cameras capable of moving about an axis of rotation to track customers in motion within the selected retail store location.

18. The computer program product of claim 11, wherein the computer usable program code for parsing the event data further comprises:

computer program code for processing the event data using at least one of a statistical method, a data mining method, a causal model, a mathematical model, a marketing model, a behavioral model, a psychological model, a sociological model, or a simulation model.

19. A system for generating an expected behavior model, the system comprising:

a database, wherein the database stores event data collected by a set of sensors; and an analysis server, wherein the analysis server parses the event data derived from video data associated with customers in a selected physical retail store location to identify behavioral patterns exhibited by the customers in the selected physical retail store location, wherein the event data comprises metadata describing events occurring in the selected physical retail store location that affect behavior of the customers in the selected retail store location; analyzes the behavioral patterns exhibited by the customers in the selected physical retail store location to determine that occurrences of the behavioral patterns are greater than or equal to a predetermined threshold to identify a set of expected behavioral patterns of the customers occurring in the selected physical retail store location; and generates the expected behavioral model using the set of expected behavioral patterns.

20. The system of claim 19, wherein the set of sensors associated with the selected physical retail store location includes a set of non-stationary digital video cameras capable of moving about an axis of rotation to track customers in motion within the selected retail store location.

* * * * *